United States Patent
Casterton et al.

(10) Patent No.: US 12,434,725 B1
(45) Date of Patent: Oct. 7, 2025

(54) GENERATING SCENE DESCRIPTIONS BY A MACHINE LEARNED MODEL

(71) Applicant: Zoox, Inc., Foster City, CA (US)

(72) Inventors: David Casterton, San Carlos, CA (US); Sean Konz, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 320 days.

(21) Appl. No.: 18/120,350

(22) Filed: Mar. 10, 2023

(51) Int. Cl.
 *B60W 50/06* (2006.01)
 *G06N 20/00* (2019.01)

(52) U.S. Cl.
 CPC ............ *B60W 50/06* (2013.01); *G06N 20/00* (2019.01)

(58) Field of Classification Search
 CPC .............................. B60W 50/06; G06N 20/00
 See application file for complete search history.

(56) References Cited

U.S. PATENT DOCUMENTS

| | | | | |
|---|---|---|---|---|
| 10,592,784 | B2* | 3/2020 | Zeng | G08G 1/167 |
| 11,960,292 | B2* | 4/2024 | Nayhouse | G05D 1/0221 |
| 2019/0196465 | A1* | 6/2019 | Hummelshøj | B60W 60/0015 |
| 2020/0160559 | A1* | 5/2020 | Urtasun | G06V 10/82 |
| 2021/0406560 | A1* | 12/2021 | Park | G06V 20/56 |
| 2023/0036840 | A1* | 2/2023 | Geraldy | B60K 35/28 |
| 2023/0206096 | A1* | 6/2023 | Paiement | G06N 3/08 |
| | | | | 706/52 |
| 2025/0078346 | A1* | 3/2025 | Couleaud | G06T 7/194 |

* cited by examiner

*Primary Examiner* — Ramsey Refai
(74) *Attorney, Agent, or Firm* — Lee & Hayes, P.C.

(57) ABSTRACT

Techniques for determining a text description of a scene in an environment by a computing device are discussed herein. The scene can represent a simulated scene for use in a simulation between a vehicle (e.g., an autonomous vehicle) and one or more objects. The computing device can implement a machine learned model to generate a text description of the simulated scene based on receiving a title and one or more scenes as input. Text descriptions can be validated and used for testing a controller of a vehicle, or other robotic device, during simulation.

22 Claims, 5 Drawing Sheets

GENERATING SCENE DESCRIPTIONS BY A MACHINE LEARNED MODEL

BACKGROUND

Machine learned models can output a synthetic environment that is intended to represent a real-world environment. The synthetic environment can be used to test how a robotic device may react in the synthetic environment. However, detail about the synthetic environment is typically limited to a few words which lack detail that can be useful to understand when to use the synthetic environment for testing. Further, lacking detail specific for each synthetic environment can make it difficult or impossible to assess how well a collection of synthetic environments represent the real-world environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
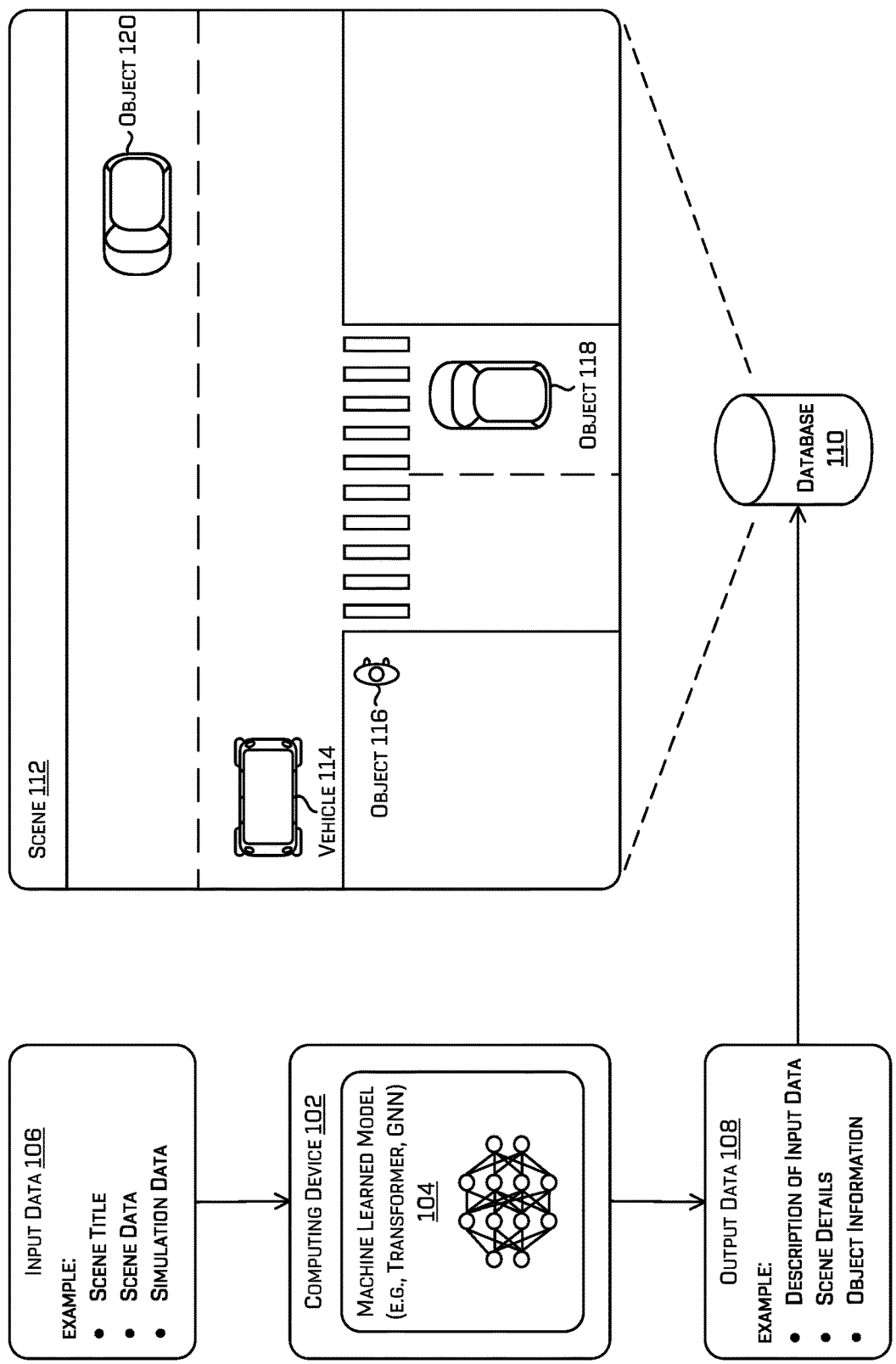
FIG. 1 is an example block diagram of an example computer architecture for implementing techniques to determine a text description of an example scene.

This application describes techniques for applying and/or training one or more models to output a description of a scene in an environment. The scene can represent a simulated scene for use in a simulation between a vehicle (e.g., an autonomous vehicle) and one or more objects. Text descriptions are disclosed for ease of understanding, but the description can represent machine-readable and/or human-readable information about the simulated scene (including labels, encodings, human-generated descriptions, etc.). In some instances, a computing device can implement a machine learned model to generate a text description of the simulated scene. The machine learned model can receive a title and one or more scenes as input, and output a description about a scene characteristic, an intersection type, a number of objects, object types, a time of day, and so on, associated with the simulated scene (e.g., provide more detail than the title provided as input). The description can be associated with the simulated scene in a storage device for access at a later time. In some examples, a library of available simulations (or scenes) can be accessed based at least in part on the description output by the machine learned model. By outputting text descriptions for a scene or simulation as described herein, a scene can be identified for testing a controller of a vehicle or other robotic device during simulation.

Generally, the model(s) can represent a text-to-text generator that enhances a short description, such as a title (e.g., 2-7 words) of a scene received as input by generating or determining a description of the content in the scene. For example, a machine learned model (e.g., a Transformer model, a generator of a Generative Adversarial Network (GAN), a Graph Neural Network (GNN), a Recurrent Neural Network (RNN), etc.) can receive text data as input and, in some examples, also receive image data representing one or more scenes of a simulation. In various examples, the scene(s) associated with the input data can be evaluated for a description independent of executing a simulation with the scene. For example, a Transformer model can be trained based on scene data and historical data associated with a vehicle, object(s), etc. in a real-world scene to output a description for a simulated scene. The description output by the machine learned model can be validated for accuracy or usefulness by a human (via a user interface) and/or by another model. For example, some descriptions may be too long (e.g., over a threshold limit of words), not make sense to a human, or otherwise not accurately describe the scene (e.g., have too many or too few words, not describe a feature, etc.). In various examples, the scene can be output for use in a simulation after the description is approved by the human or the model.

In some examples, the description for a scene can be generated prior to the scene being used in a simulation, and without requiring that the scene be executed in a simulation. For example, a machine learned model can be trained using scene descriptions for various scenes that are hand-labeled, synthetically generated, or a combination thereof. The machine learned model may also or instead be trained using log data associated with one or more vehicles having previously navigated in a real-world environment.

In examples when the scene is used for simulation with an autonomous vehicle, the description can be described relative to the autonomous vehicle (e.g., a road junction description, number of objects, scene location, weather conditions, time of day, etc.). Components of the autonomous vehicle that control its operation can be modified based on real-world performance of the autonomous vehicle, so a representation of the autonomous vehicle can respond differently to a same scene over time. In other words, the scene can be used differently over time as changes are made to one or more components that control the autonomous vehicle. Thus, the machine learned model can update a description for a scene periodically to capture changes is how the scene may be used during a simulation. Further, the techniques described herein can be used to ensure that scenes is a database, memory, or other storage device have current descriptions.

In various examples, a computing device can receive a job request via a user interface that identifies a type of simulation to perform using the autonomous vehicle (or representation thereof). In such examples, a model or component can review the scene descriptions to identify scenes for performing the simulation, and optionally output the scene descriptions in the user interface. The user interface can also or instead be used to provide user input associated with a scene description (e.g., initiate, delete, or manage a library of descriptions and associated data). In various examples, the user interface can provide visibility to one or more teams to indicate which jobs are pending, completed, and/or deleted. The user interface can also, for example, provide functionality to receive an input identifying scene data that should or should not be deleted.

To further illustrate the data managing techniques described herein, consider a scenario in which a vehicle computing device controls an autonomous vehicle (e.g., controls a steering action, a braking action, an acceleration action, and so on) relative to another object, such as another vehicle, pedestrian, bicyclist, and the like. A user may provide input to a user interface indicating a request for simulation data to train a prediction component and/or a planning component of the vehicle computing device. In this example, the planning component may be configured to determine an action, a route, and/or a trajectory for a vehicle based on predictions received from the prediction component (e.g., the planning component is related to the prediction component by receiving data as input from the prediction component). In such examples, the descriptions can be used to identify scenes for simulation to test a response (or determinations) by the planning component. In this way, the scenes and associated descriptions can be used to improve safety of a vehicle controlled by a vehicle computing device in an environment (e.g., a simulated environment and/or a real-world environment).

In some examples, data output from the machine learned model (e.g., text descriptions of different scenes) can be used in a simulation, and an outcome of the simulation can be used to modify one or more settings or parameters associated with a perception component, a prediction component, or a planning component (or other components) of the vehicle computing device that controls the vehicle. For example, an outcome of a simulation using particular scenes can be used to update settings or parameters that control operation of the autonomous vehicle. In this way, objects detected by the vehicle computing device, predictions by a component (e.g., a vehicle trajectory, an object trajectory, etc.) can be determined with more accuracy versus not implementing the machine learned model.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device in a number of ways including generating descriptions for a scene, a simulation, log data, or other input data. A broad or relatively short description can be enhanced while also being limited in size to improve how scenes can be selected from available scenes so that an outcome of the simulation is performed using fewer scenes (and less computational resources) by identifying the most useful scenes for a particular objective. Descriptions generated by a model can be updated over time to increase using scenes or simulations that make the best use of available computation resources (e.g., determine responses in less time and with fewer steps than not using the description as described herein).

The techniques discussed herein can also improve a functioning of a vehicle computing device of a vehicle in a number of ways. For example, the vehicle computing device may output, receive, or process text descriptions for scenes to improve the usefulness and understanding of using a particular scene, or combination of scenes, in a simulation. In some examples, the vehicle computing device may improve functioning and safety of the vehicle by identifying a response by one or more components to improve perception, prediction, and/or planning operations which can ultimately lead to safer performance of the vehicle. Further, an output from the vehicle computing device can be stored and used at a later time to save an amount of memory resources and/or computational resources required to generate accurate determinations by a component. In addition, the techniques described herein can improve passenger comfort and/or vehicle safety such as, for example, avoiding sudden braking or swerving when not needed by improving operation of vision, lidar, and/or radar sensors used to perceive an environment.

In the context of autonomous vehicles, the techniques can be used to generate text descriptions for a large number of simulations (e.g., 100 thousand to a million or more). The simulations can be indexed and/or searched for based on the description, which can aid in storage and indexing, and recall. Further, by including the description for the simulations, a computing device can access the "correct" simulations which can improve training of one or more components of the computing device.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 illustrates an example block diagram 100 of an example computer architecture for implementing techniques to determine a text description of an example scene. For example, a computing device 102 including a machine learned model 104 can receive input data 106 and determine output data 108 describing the input data 106 at a particular level of detail. The output data 108 can optionally be stored in a database 110. In some examples, the techniques described in FIG. 1 can be performed by the vehicle computing device(s) 404 and/or the computing device(s) 434 of FIG. 4.

The machine learned model 104 can represent functionality to receive the input data 106 from one or more sources and determine a text description (e.g., human read-able) describing the input data 106. The machine learned model 104 can represent a variety of different models such as a Transformer model, a variable autoencoder, a diffusion model, a generative adversarial model (GAN), a graph neural network (GNN), or another model.

In some examples, the input data 106 can be associated with and/or received from a generative model that is configured to generate a scene for simulation, or a simulated scene. The machine learned model 104 can, for instance, receive a scene title and scene data associated with a scene 112 (e.g., a simulated scene or a real-world scene). The scene title can describe the scene is a few words (e.g., 3-7 words provided by another model or a human) and the scene data can include an image of the scene 112. In various examples, the machine learned model 104 can output a description for the scene 112 describing a roadway, intersection, vehicle, objects interactions, object behavior, vehicle behavior, traffic control information, temporal information, or other features of the scene 112.

In some examples, the input data 106 can include simulation data having two or more scenes to represent different instances in the future. The simulation data can, for instance, refer to data for performing a simulation (e.g., conditions or criteria for the simulation, scenes in the simulation, objects in each scene, etc.). Additionally, or alternatively, the simulation data can refer to data output resultant from performing the simulation. In various examples, the machine learned model 104 can output a description for a simulation (e.g., several scenes collectively, etc.) independent of being required to execute the simulation for processing.

In some examples, the input data 106 can represent log data associated with an autonomous vehicle. For instance, the log data can represent actions, setting, and the like of one or more components of a vehicle computing device associated with the autonomous vehicle. The log data also or instead represent one or more of: sensor data associated with the autonomous vehicle, simulation data from a previously executed simulation, passenger data, a vehicle trajectory, an object trajectory associated with an object proximate the vehicle, map data describing a rea-world environment, route data describing a path to a destination, calibration data, perception data, teleoperation data, and/or traffic data, just to name a few. For instance, the log data can include sensor data from one or more sensors coupled to the vehicle, simulation data from a simulation involving the vehicle, and/or file data (e.g., data portions representing messages over time). The log data can, for example, include information about one or more objects in the real-world scene(s) such as an object velocity, acceleration, position, orientation, pose, and the like. In various examples, the log data can also include information about the real-world environment such as weather, time of day, seasonal information, among others. In various examples, the machine learned model 104 can output a description for data portions associated with the log data.

As shown in FIG. 1, the scene 112 includes a vehicle 114, an object 116 (e.g., a pedestrian), an object 118 (another vehicle), and an object 120 (another vehicle), though the scenes may include fewer or additional objects and/or objects of different object types. The scene 112 can represent a real-world scene in which the vehicle 114 is an autonomous vehicle and the objects are real-world objects. The scene 112 can instead represent a simulated scene in the which the vehicle 114 may or may not represent a real-world vehicle (or be included in the simulated scene), and the objects are simulated objects. In some examples, the vehicle 114 can navigate in an environment represented by the scene 112 to a destination while avoiding the object 116, the object 118, and the object 120.

In examples when the scene 112 is a real-world scene, a vehicle computing device associated with the vehicle 114 may be configured to detect one or more objects (e.g., the objects 116). In some examples, the vehicle computing device may detect the objects, based on sensor data received from one or more sensors. In some examples, the sensors may include sensors mounted on the vehicle 114, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 114 may be configured to transmit and/or receive data from other autonomous vehicles, remote sensors, and/or the sensors. The data may include sensor data, such as data regarding the objects detected in the scene 112.

In various examples, the vehicle computing device can receive the sensor data and can semantically classify the detected objects (e.g., determine an object type), such as, for example, whether the object is a pedestrian such as the object 116, another vehicle such as the object 118 and the object 120, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.).

In various examples, the scene 112 can represent a top-down view (or top-down representation) of an environment. The top-down representation may be determined based at least in part on map data and/or sensor data (e.g., lidar data, radar data, image data, etc.) captured from or associated with a sensor of an autonomous vehicle in the environment, and may represent a top-down view of the environment to capture context of the autonomous vehicle (e.g., identify actions of other objects such as vehicles and pedestrians relative to the vehicle).

In some examples, the machine learned model 104 can receive map data representing top-down multi-channel data indicative of a top-down representation of an environment (e.g., wherein each channel or layer comprises data about the scene). In some examples, such channels may represent, for example, occupancy, speed, lane indications, speed limits, traffic control, object type, etc. The top-down representation can include a channel(s) to represent one or more of: an attribute (e.g., position, class, velocity, acceleration, yaw, turn signal status, etc.) of an object, history of the object (e.g., location history, velocity history, etc.), an attribute of the vehicle (e.g., velocity, position, etc.), crosswalk permission, traffic light permission, and the like. Thus, the scene 112 can include one or more channels to convey various contexts of a real-world scene and/or a simulated scene (which may or may not have been generated to include objects relative to a representation of an autonomous vehicle).

In some examples, the scene data (e.g., the scene 112) can be represented by a graph, a vector representation, or other representation other than the top-down view of the environment. For instance, the generative model can, additionally or alternatively, output a vector representation of the environment, vehicle, object(s), etc. In some examples, the vector representation can be determined by a Graph Neural Network which is a type of neural network which operates on a graph structure. Machine-learning based inference operations may be performed to update the state of the graph neural network, including updating nodes and/or edge features, based on internal inputs determined from the graph neural network itself and/or based on updated observations perceived by the autonomous vehicle in the environment. The vector can represent a feature of the scene including but not limited to a vehicle, an object, a roadway, a trajectory over time, and so on. A vector can have different points along its length to represent a location of the object (or vehicle) in the environment at different times in the future.

The vector representation may, in some examples, be determined based on a polyline (e.g., a set of line segments) representing one or more map elements. For instance, the Graph Neural Network can encode and aggregate the polyline into a node data structure representing with the map element(s). For example, an object or feature of the environment can be represented by polylines (e.g., a lane can be segmented into a number of smaller line segments whose length, location, orientation angle (e.g., yaw), and directionality, when aggregated, define the lane). Similarly, a crosswalk (or other feature of the environment) may be defined by four connected line segments, and a roadway edge or roadway centerline may be multiple connected line segments.

In some examples, a first vector can represent an initial description (e.g., a scene title), and a second vector can represent an image (e.g., a scene), and the machine learned model 104 can implement a word embedding to generate a text description having more detail than the initial description. In various examples, the machine learned model 104 can determine a vector embedding to represent one or more words, and a matrix of vector embeddings can represent the output data 108.

Whether the scene is represented by a top-down view, a vector, or some other representation, the machine learned model 104 can receive generic descriptions of a scenario such as "a vehicle approaching the autonomous vehicle at 10 mph, pedestrian crossing in front, dog behind the autonomous vehicle", and output an improved description such as "a vehicle yields to a pedestrian before taking a left turn in front of the autonomous vehicle while pedestrian crosses in front and an unattended dog enters the roadway behind the autonomous vehicle".

In some examples, the machine learned model 104 can generate the output data 108 to include a sequence of words to describe the scene 112. The machine learned model can generate words to describe the environment of the scene 112 (e.g., urban, rural, weather, time of day, physical features, etc.), object information (e.g., an object state of one or more objects in the scene or in the simulation), vehicle information, (e.g., vehicle state data, etc.), or other features of the scene 112.

The database 110 can store the output data 108 for access by a model, a component of a computing device (e.g., a vehicle computing device) at a later time. For instance, the computing device 102 can associate the text description output from the machine learned model 104 with other information about the scene 112 as scene information. The scene information can be accessed to identify a scene for simulation responsive to a request from a user and/or from another model, the machine learned model 104 may, for example, index the scene for search based at least in part on the title of the scene and the text description for the scene.

The output data 108 from the machine learned model 104 can be used in a variety of ways. For example, the output data 108 can be used to control a vehicle, or representation of the vehicle, in a real-world environment and/or a simulated environment. In some examples, a user can provide, via a user interface, a description of a scenario for simulating an autonomous vehicle in a simulated environment, and the computing device 102 can access the scene information from the database 110 to determine which scenes to use in the scenario. For examples, the description of the scenario from the user can be compared to the descriptions of available scenes in the database 110 to determine which scenes can be used in the scenario (e.g., a simulation over a time period) associated with a user request. Further, the machine learned model 104 can update a description of a scene over time and/or identify if a simulated scene having a similar description is already stored in the database 110. In various examples, the output data 108 can be used to assess how well a corpus of scenes in the database 110 represents a real-world environment based at least in part on the descriptions of each scene. Additional examples of using the output data 108 are discussed throughout this disclosure, including in FIG. 3.

In some examples, the output data 108 can be used as training data to train a machine learned model (e.g., the machine learned model 104 or another machine learned model). Training data may include a wide variety of data, such as data output by a component, image data (e.g., a static scene), video data (e.g., a sequence of scenes), lidar data, radar data, audio data, other sensor data, etc., that is associated with a value (e.g., a desired classification, inference, prediction, etc.). Such values may generally be referred to as a "ground truth." To illustrate, the training data may be used for generating text descriptions for a scene and, as such, may include an image of an environment that is captured by an autonomous vehicle and that is associated with one or more classifications.

Figure 2:
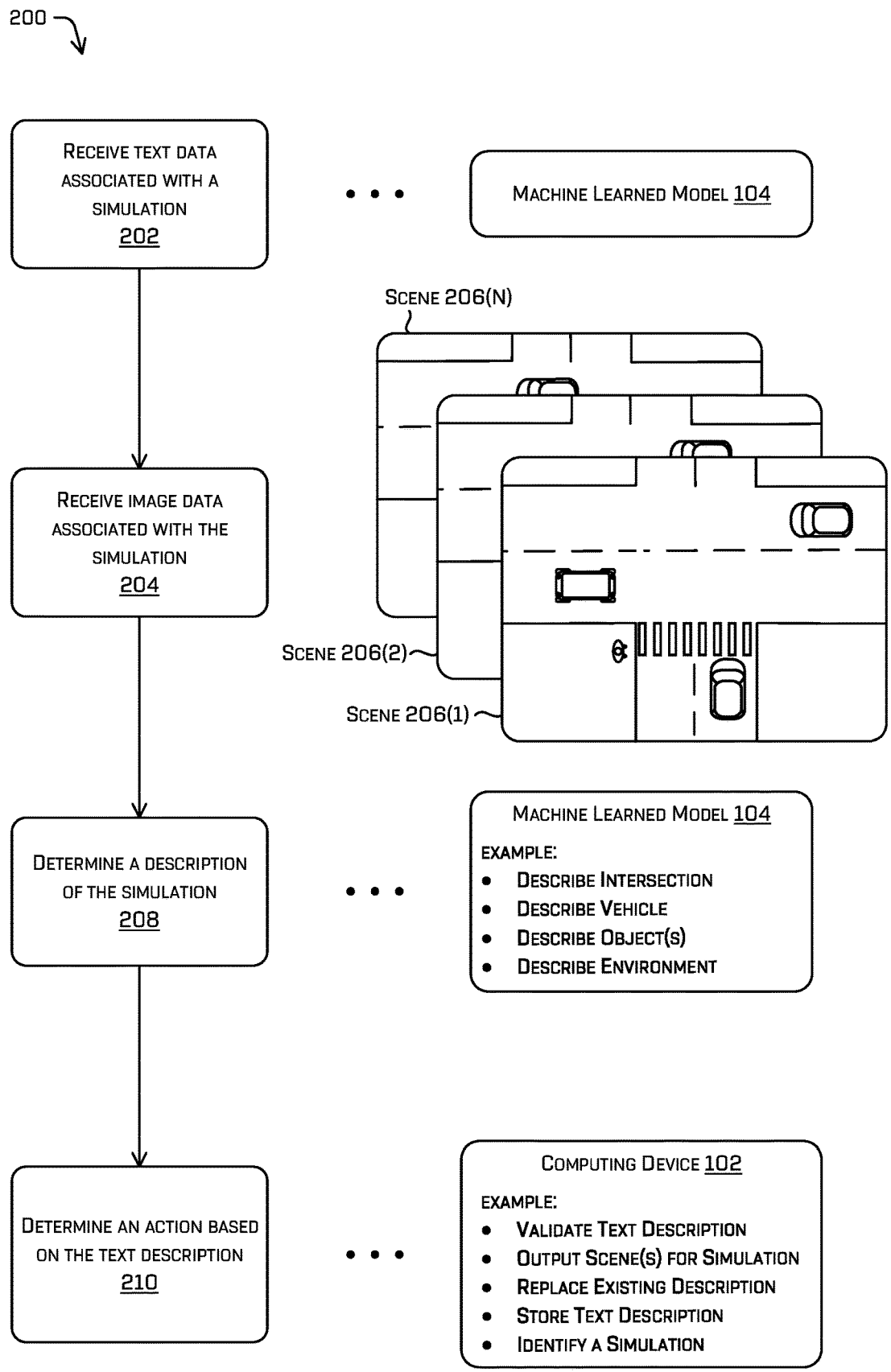
FIG. 2 is a pictorial diagram illustrating an example process by an example computing device to determine a text description of an example simulation.

FIG. 2 is a pictorial diagram illustrating an example process 200 by an example computing device to determine a text description of an example simulation. The example process 200 may be implemented by a computing device such as the computing device 102 of FIG. 1, the vehicle computing device 404 and/or the computing device(s) 434 of FIG. 4.

An operation 202 can include receiving text data associated with a simulation. For instance, the machine learned model 104 can receive the input data 106 representing a title for each scene used as part of the simulation. For example the text data can describe a simulated scene output by a generative model which has not been executed for simulation. The text data can also or instead describe a real-world scene using fewer than ten words to describe the real-world scene generally. The scene title(s) can, for example, broadly describe a respective scene of the simulation or the simulation as a whole. A title can include, for instance, "City intersection with Pedestrians", "Existing Highway with Traffic", though another reasonable short description may apply.

An operation 204 can include receiving image data associated with the simulation. For instance, the machine learned model 104 can receive scene data from the generative model and/or access scene information from the database 110. The scene data can be associated with the scene 112, for instance. The simulation can include multiple scenes having one or more objects and a vehicle that, when the simulation is executed by a processor of a computing device, the scenes can be used to identify potential interactions between the vehicle and the one or more objects. As shown in FIG. 2, the simulation can comprise a scene 206(1), a scene 206(2), . . . , and a scene 206(N) (collectively "the scenes 206") where N can be any integer greater than 1. Each of the scene 206 can be associated with a different period of time. In various examples, the image data can be received prior to the simulation being executed by the processor such that the text description is automatically determined independent of executing the simulation.

An operation 208 can include determining a description of the simulation. In various examples, the machine learned model 104 can determine machine-readable data and/or human-readable data that includes more detail than the text data and the image data. In some examples, the description can represent a label, text, and/or an image (for representing the simulation visually using a single image). For instance, the machine learned model 104 can receive the image data (and not necessarily the text data) that includes multiple images or a video, and identify or otherwise select an image from the multiple images or the video to represent the simulation.

In various examples, the machine learned model 104 can generate text in addition to and/or different from the text data to enhance an amount of information for the scenes 206. The text description can describe an intersection, a vehicle, an object(s), and/or an environment for each of the scenes independently or collectively. In various examples, the text description can be based at least in part on the machine learned model 104 being trained using ground truth descriptions (e.g., values representing machine-readable descriptions, human-readable descriptions, etc.) and/or image data to enable the machine learned model 104 to generate the text description with consideration to select words for different scene features. In some examples, training data can include a static image that represents a simulation, or sequence of images. The intersection information may include describing an interchange type, a number of lanes, attributes about a lane (e.g., multiuse, one-way, 4-way stop, etc.), traffic control information including fixed or electronic signs, crosswalk information, and so on. The text description can also or instead describe temporal information given that a number of objects or object types can vary in a same scene at different times of day, month, or seasonally.

The text description can describe a position of the vehicle relative to the positions of other objects, and can include specific information about the one or more objects. For example, the text description may include "four-way intersection with an occupied crosswalk and different vehicle types none using a signal." Here, the object type such as a truck, a moped, motorcycle, etc. can be described in the text description, as well as any use of signals or other contextual information (e.g., lane directionality, speed limit, surface characteristics, observed object behavior, observed characteristics of an autonomous vehicle traversing the road segment, etc.).

In various examples, the machine learned model 104 can determine the text description based at least in part on criteria provided by a user or a model. For instance, the criteria can include using unique words, word order, or number of words, just to name a few. By way of example and not limitation, a first team having a first purpose for using a simulation can request that descriptions be generated in a particular format, or that the descriptors for the scene are in a certain order. The computing device 102 can manage a dataset of descriptions output by the machine learned model 104, and the machine learned model 104 can generate the descriptions to enable the computing device 102 to organize and reorganize the descriptions according to the criteria. In this way, descriptions can be generated for a specific purpose and/or team.

An operation 210 can include determining an action based on the text description. For instance, the machine learned model 104 can validate the text description to determine whether to output the scenes 206 for simulation. Validation can include receiving an input from another model and/or a user input via a user interface indicating that the text description is sufficiently accurate to associate with the simulation, such as in a record for storage in the database 110. Validating can include determining that the text description is different from another text description in the database 110 to avoid duplicate entries and to ensure a diverse description is used for different scenes. In some examples, a model can compare features of the text description to an accuracy threshold that indicates a minimal level of accuracy for the description to depict an action, or potential actions, associated with the scenes 206.

In some examples, the text description can replace or update a current entry in the database 110 while in other examples the text description can be associated with a "new" scene or simulation not yet included in the database 110.

The operation 210 can include analyzing the text description to match a scenario description associated with a simulation request from a user interface and/or a model. For example, the computing device 102 can receive a request for scenes to test a specific scenario that a component of a vehicle computing device has encountered, or is expected to encounter, in a real-world environment. In such examples, the computing device 102 can access the database 110 and identify scene descriptions that match the scenario description. The computing device 102 can output an indication of the one or more scenes that best represent the scenario request to cause simulations to be performed using scenes that are best able to test a response by the component in the scenario described.

Figure 3:
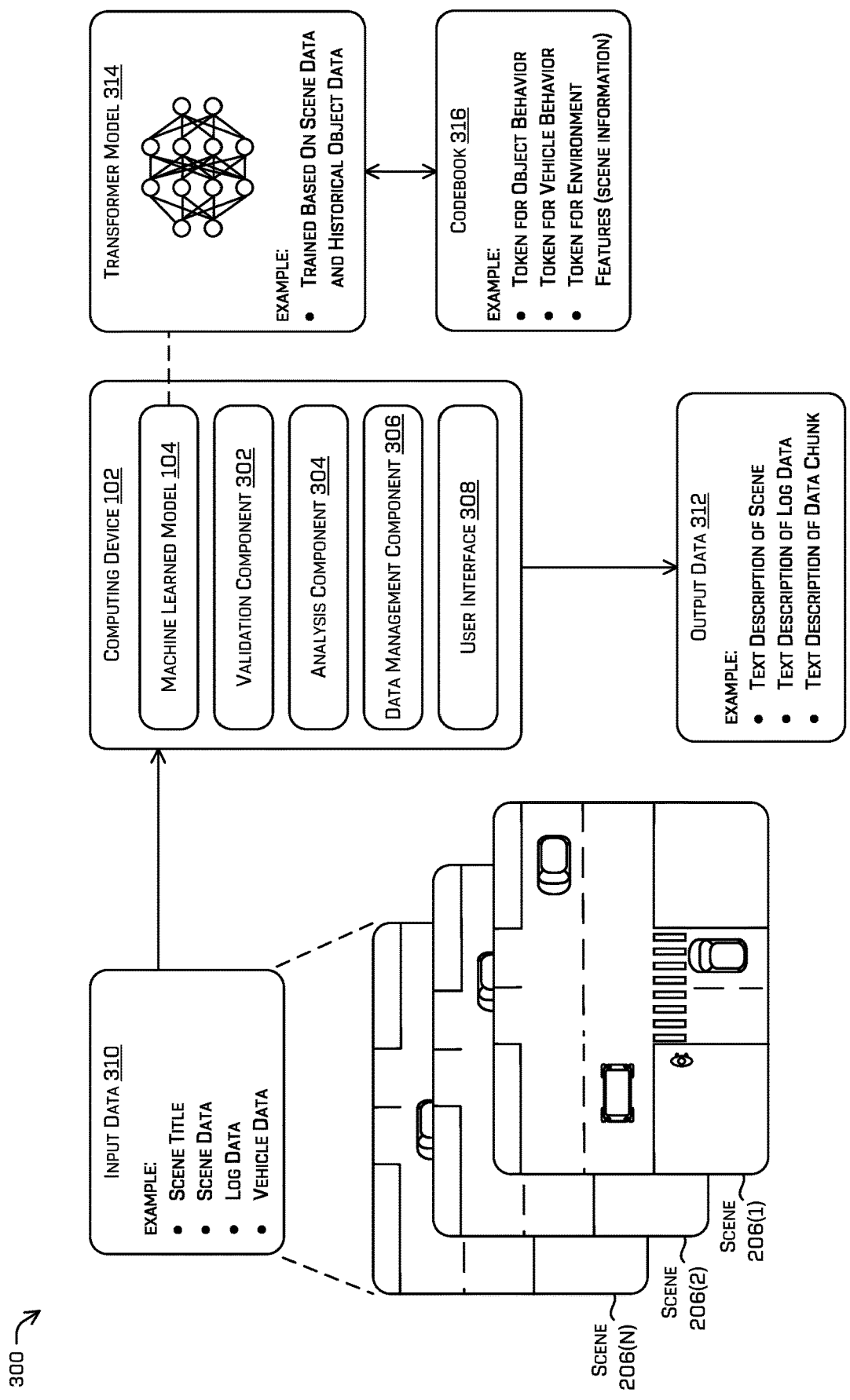
FIG. 3 is another example block diagram of an example computer architecture for implementing techniques to determine a text description of example input data.

FIG. 3 is another example block diagram 300 of an example computer architecture for implementing techniques to determine a text description of example input data. The example diagram 300 may be implemented by a computing device such as the computing device 102 (as shown), and in some examples may also or instead be implemented by the vehicle computing device 404 and/or the computing device(s) 434 of FIG. 4.

As shown in FIG. 3, the computing device 102 includes the machine learned model 104, a validation component 302, an analysis component 304, a data management component 306, and a user interface 308. The computing device 102 can receive input data 310 (e.g., text data, scene data, log data, vehicle data, etc.) which may comprise a scene title for a scene, and determine output data 312 representing a text description for the scene, log data, a data chunk, or the like. The output data 312 can represent the output data 108 of FIG. 1.

The validation component 302 can represent functionality to validate the output data 312 from a model and/or component of the computing device 102. For instance, the text description can be output in a user interface associated with the computing device 102 and/or a remote computing device. The validation component 302 can receive a user input to confirm or deny the text description based on accuracy of the text description. In some examples, the validation component 302 can verify that a length of the text description is greater than a length of the scene title and less than a maximum threshold value that limits the effectiveness of a human to review the content. In other words, the machine learned model 104 can generate the output data 312 with consideration to a maximum number of words for a human reviewer (e.g., between 20-50 words).

In various examples, the validation component 302 can also or instead receive validation of the output data 312 from another model such as a model (e.g., the analysis component 304) configured to compare features of the text description to one or more criteria. For instance, a number of words, word order, etc. of the text description can be compared to criteria (e.g., a maximum number of words, word diversity in a description, description diversity among generated descriptions, etc.) by the analysis component 304. For instance, the analysis component 304 can evaluate the output data 312 to validate that the description is unique relative to other descriptions (e.g., in a storage device), does not exceed a maximum length of words, among others. In some examples, the model can validate the output data 312 based at least in part on determine whether descriptors in the description meet criteria that describes a format or descriptor preference for different uses (for a different team, for a specific simulation type, etc.).

The data management component 306 can represent functionality to manage scene data associated with different scenes. For instance, the data management component 306 can determine or otherwise receive an outcome of a simulation (e.g., response from one or more components of a vehicle computing device). In various examples, a setting or parameter of a component can be updated (e.g., a model can be trained to improve determinations thereof). That is, the component can be trained based at least in part on the outcome of the simulation, and the data management component 306 can initiate receiving new output data from the computing device 102 to update the text description associated with scenes used as part of the simulation. For example, the data management component 306 can determine an action by the vehicle navigating in a real-world environment, and determine a difference between the outcome and the action (e.g., a difference between an expected response based on the simulation and an actual response in the real-world environment). Based on the difference, the data management component 306 can determine whether to update the text description for the simulation (e.g., a difference at or above a threshold difference can be updated while values below the threshold difference can indicate to not update the text description.

In some examples, the data management component 306 can determine a similarity between the simulation and another simulation in the database 110 based at least in part on comparing the text descriptions of different scenes or simulations one to another. For example, the data management component 306 can associate the first scene with a second scene based at least in part on the comparing (e.g., a similarity and/or a difference) between the first text description and a second text description associated with the second scene (e.g., based on a change between the respective text descriptions being within a threshold value).

In some examples, the data management component 306 can determine a similarity between simulations based at least in part on comparing respective descriptions for each simulation. For example, the data management component 306 can identify same words or related words (e.g., coarse bucketizing of related words) between a first description and a second description. Comparing description can also or instead include identifying that two simulations both include a crosswalk with multiple pedestrians and a similar number of objects, object speeds, object types, and so on. In examples when the descriptions are generated from vector representations, a difference between a first value(s) of a first matrix of embedded vectors and a second value(s) of a second matrix of embedded vectors can be used to identify related simulations.

The user interface 308 can represent functionality to receive data from a user describing a request to perform a simulation, validation of a text description, criteria for a simulation, and the like. For instance, the user interface 308 be used to send and/or receive data between components or computing devices as describe herein.

In some examples, the user interface 308 may be employed to receive job requests (e.g., a request for scenes usable as training data, or in a simulation), to indicate simulation criteria for one or more simulations to test a component. The user interface 308 can output controls usable to receive an input from a user associated with an instance of the user interface output for display on a display device of the computing device 102 and/or an instance of the user interface output for display on a display device of a remote computing device. The user interface 308 can, for example, include controls to receive information such as a simulation name, types of scenes, a start time, and end time, a time of day, or other information usable to initiate a request for a simulation involving one or more components of a computing device (e.g., the computing device 102 and/or the computing device(s) 404). The user interface 308 may also or instead provide an indication on a display device indicating a status of the job request such as whether the job request is complete, incomplete, or deleted.

As mentioned, the input data 310 can represent one or more of: text data, scene data, log data, vehicle data, etc., and may include or represent examples described in relation to the input data 106 in FIG. 1. In some examples, the input data 310 can represent log associated with one or more autonomous vehicles in a fleet. In some examples, the log data can represent one or more of: sensor data, simulation data, passenger data, a vehicle trajectory, an object trajectory, map data, route data, calibration data, perception data, teleoperation data, and/or traffic data, just to name a few. For instance, the log data can include sensor data from one or more sensors coupled to the vehicle, simulation data from a simulation involving the vehicle, and/or file data (e.g., data portions representing messages over time). The log data can, for example, include information about one or more objects in the real-world scene(s) such as an object velocity, acceleration, position, orientation, pose, and the like. In various examples, the log data can also include information about the real-world environment such as weather, time of day, seasonal information, among others. The log data may also or instead be associated with subsystems that monitor vehicle health (e.g., operation of the drive system, braking system, battery system, and the like), passenger comfort, and/or ride service applications, just to name a few. In some examples, log data can be generated vis simulations in which, for example, a simulated or real autonomous vehicle traverses a simulated environment and/or senses simulated objects.

In some examples, the log data can represent data output over time by one or more of: a localization component (e.g., the localization component 420), a perception component (e.g., the perception component 422), and a planning component (e.g., the planning component 424), though other components or data sources are also contemplated. In various examples, the log data received by the computing device 102 may represent object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle). The log data may also include, in some examples, two-dimensional image data (e.g., top-down multi-channel "image" data indicative of a top-down representation of an environment) or three-dimensional image data that includes bounding box(es) to represent object(s) in an environment.

In some examples, the analysis component 304 can identify, evaluate, or otherwise analyze log data to identify text fields, object characteristics, and so on which can be considered by the machine learned model 104 when generating the output data 312. For instance, the output data 312 can represent a refined description of the input data 310 by including a maneuver, a location, a weather condition, a type of sensor associated with the log data, an object type, etc. In some examples, the analysis component 304 can also or instead analyze metadata associated with a previous simulation involving a vehicle (e.g., the vehicle 114, the vehicle 402) to generate the output data 312.

By way of example and not limitation, the output data 312 (or a portion thereof) may be used to update one or more components of the vehicle computing device to cause a vehicle (e.g., the vehicle 114, the vehicle 402) to avoid an intersection with an object, to change a setting or parameter associated with a sensor of the perception component, to improve determinations or predictions regarding a location, a trajectory, and the like. Accordingly, the output data 312 may be taken into account in operations (e.g., simulations, estimated states, interaction modeling, collision estimation, etc.) or other vehicle control planning operation (e.g., determine a vehicle trajectory and/or control a propulsion system, a braking system, or a steering system by a planning component) to quickly and/or preemptively avoid objects, thereby improving safety of the vehicle.

As shown in FIG. 3, the machine learned model 104 can include a Transformer model 314 that is configured to use a codebook 316 comprising tokens that represent one or more words to describe the scene, an object therein, a vehicle, etc. In some examples, the Transformer model 314 can arrange the tokens in a sequence or cluster the tokens to arrange text or words that represent the output data 312. In a non-limiting example, the Transformer model 314 can receive top-down representations of various scenes as training data, and once trained, can output a text description of a scene based on receiving a relatively short text input (e.g., 4-7 words).

In some examples, the Transformer model 314 comprising one or more self-attention layers to receive or otherwise arrange tokens from the codebook 316. Tokens can represent text such as a word or a sequence of words associated with the scene and/or an object or vehicle therein. The Transformer model 314 can arrange tokens from the codebook 316 in a sequence to represent object, scene, and vehicle information to determine the output data 312 by using the one or more self-attention layers to arrange tokens in a particular order or cluster.

In some examples, a first token in the codebook 316 can represent a description for a characteristic (e.g., a state or an action) of a vehicle and/or an object such as one of: a yield action, a drive straight action, a left turn action, a right turn action, a brake action, an acceleration action, a steering action, or a lane change action, and so on. A second token can represent, for instance, language to describe a position or a behavior of the object. An additional token can represent language associated with an action or state of the vehicle.

In various examples, the codebook 316 can exchange data with a Transformer model 314 that is configured to output the output data 312. For example, the Transformer model 314 can sample tokens from the codebook 316 using an autoregressive technique (or other technique), and arrange the tokens in a sequence or set that represents the text description that is understandable by a human or model.

Figure 4:
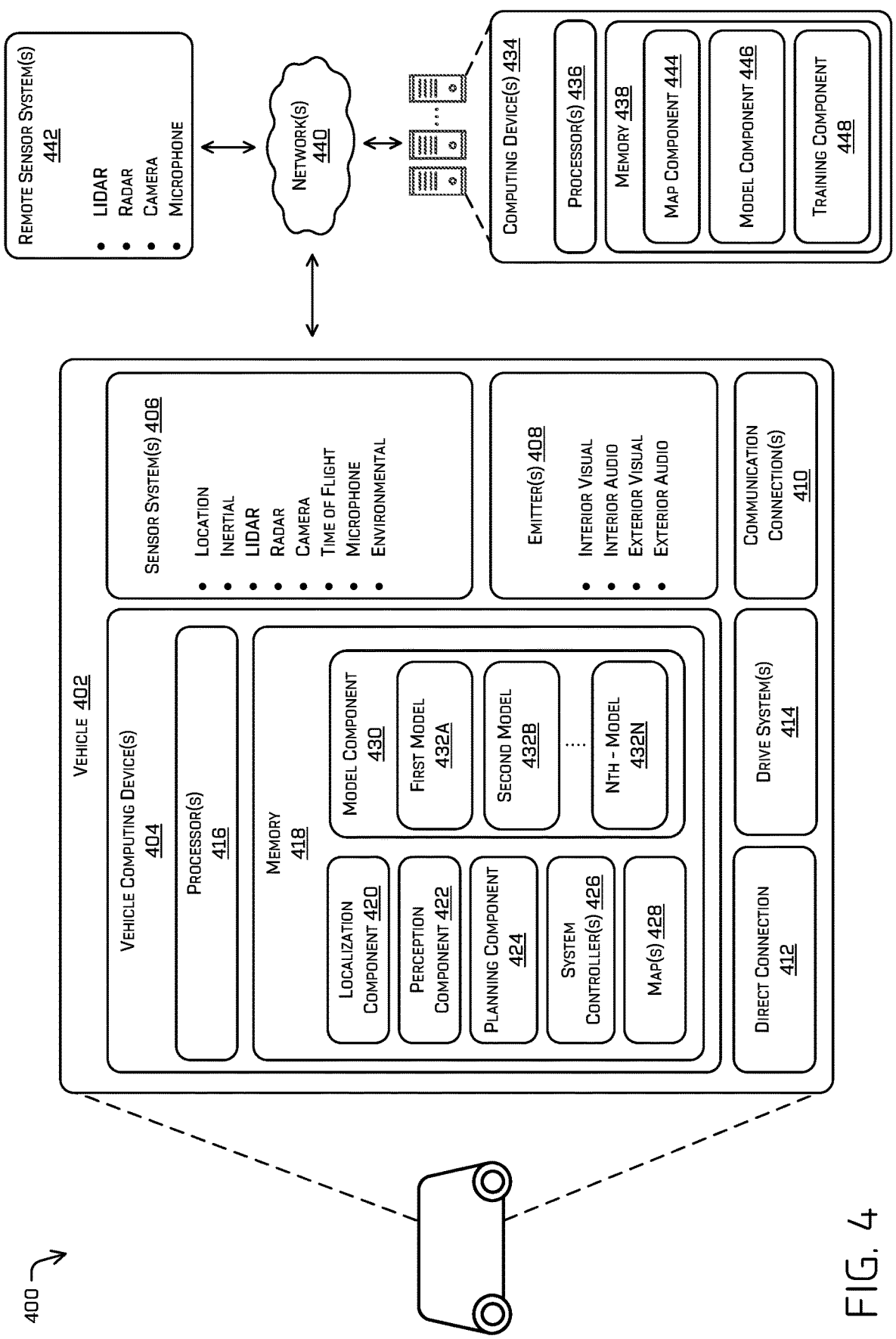
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device(s) 404, one or more sensor systems 406, one or more emitters 408, one or more communication connections 410, at least one direct connection 412, and one or more drive system(s) 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device(s) 404 may store sensor data associated with actual location of an object at the end of the set of estimated states (e.g., end of the period of time) and may use this data as training data to train one or more models. In some examples, the vehicle computing device(s) 404 may provide the data to a remote computing device (i.e., computing device separate from vehicle computing device such as the computing device(s) 434) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference in its entirety and for all purposes.

In the illustrated example, the memory 418 of the vehicle computing device(s) 404 stores a localization component 420, a perception component 422, a planning component 424, one or more system controllers 426, one or more maps 428, and a model component 430 including one or more model(s), such as a first model 432A, a second model 432B, up to an Nth model 432N (collectively "models 432"), where N is an integer. Though depicted in FIG. 4 as residing in the memory 418 for illustrative purposes, it is contemplated that the localization component 420, a perception component 422, a planning component 424, one or more system controllers 426, one or more maps 428, and/or the model component 430 including the model(s) 432 may additionally, or alternatively, be accessible to the vehicle 402 (e.g., stored on, or otherwise accessible by, memory remote from the vehicle 402, such as, for example, on memory 438 of a remote computing device 434). In some examples, the model(s) 432 can provide functionality associated with the machine learned model 104. In some examples, the model(s) 432 can include one or more of: an encoder, a quantizer, a codebook, a decoder, a transformer model, a machine learned model, and so on.

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428 and/or map component 444, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects (e.g., objects) in an environment and/or to generate predicted candidate trajectories for the vehicle 402. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing device(s) 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect objects in an environment, generate routes, determine actions and/or trajectories to navigate within an environment.

In some examples, the one or more maps 428 may be stored on a remote computing device(s) (such as the computing device(s) 434) accessible via network(s) 440. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing device(s) 404 may include a model component 430. The model component 430 may be configured to perform the functionality of the machine learned model 104, including determining a text description for a scene output by a generative model. The model component 430 can also or instead represent one or more of the components of FIG. 3 (e.g., the validation component 302, the analysis component 304, the data management component 306, and/or the user interface 308). In various examples, the model component 430 may receive one or more characteristics associated with the detected object(s) from the perception component 422 and/or from the sensor system(s) 406. In some examples, the model component 430 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 430 could be part of the planning component 424 or other component(s) of the vehicle 402.

In various examples, the model component 430 may utilize machine learned techniques to determine a text description for input data (e.g., the input data 310) which can include describing a scene or environment. The model component 430 may send determinations or predictions from the one or more models 432 that may be used by the planning component 424 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 424 may determine one or more actions (e.g., reference actions and/or sub-actions) for the vehicle 402, such as vehicle candidate trajectories. In some examples, the model component 430 may be configured to determine descriptions usable to identify scene data for a simulation (e.g., determine whether an object occupies a future position based at least in part on the one or more actions for the vehicle 402. In some examples, the model component 430 may be configured to determine the actions that are applicable to the environment, such as based on environment characteristics, weather characteristics, another object, or the like.

As can be understood, the components discussed herein (e.g., the localization component 420, the perception component 422, the planning component 424, the one or more system controllers 426, the one or more maps 428, the model component 430 including the model(s) 432 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 438, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional or alternate examples of architectures may include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, ROBERTa, XLNet, GPT-2, GPT-3, or the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally, or in the alternative, the sensor system(s) 406 may send sensor data, via the one or more networks 440, to the one or more computing device(s) 434 at a particular frequency, after a lapse of a predetermined period of time, in near real-time, etc.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 434, other nearby vehicles, etc.) and/or one or more remote sensor system(s) 442 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device(s) 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the model component 430, may process sensor data, as described above, and may send their respective outputs, over the one or more network(s) 440, to the computing device(s) 434. In at least one example, the localization component 420, the perception component 422, the planning component 424, the one or more system controllers 426, the one or more maps 428, and the model component 430 may send their respective outputs to the remote computing device(s) 434 at a particular frequency, after a lapse of a predetermined period of time, in near real-time, etc.

In some examples, the vehicle 402 may send sensor data to the computing device(s) 434 via the network(s) 440. In some examples, the vehicle 402 may receive sensor data from the computing device(s) 434 and/or remote sensor system(s) 442 via the network(s) 440. The sensor data may include raw sensor data and/or processed sensor data and/or representations of sensor data. In some examples, the sensor data (raw or processed) may be sent and/or received as one or more log files.

The computing device(s) 434 may include processor(s) 436 and a memory 438 storing the map component 444, a model component 446, and a training component 448. In some examples, the map component 444 may include functionality to generate maps of various resolutions. In such examples, the map component 444 may send one or more maps to the vehicle computing device(s) 404 for navigational purposes. In various examples, the model component 446 may be configured to receive data from one or more remote sensors, such as sensor system(s) 406 and/or remote sensor system(s) 442. The model component 446 may be configured to perform the functionality of the machine learned model 104, including determining a text description for a scene output by a generative model. The model component 430 can also or instead represent one or more of the components of FIG. 3.

In some instances, the training component 448 (e.g., trained in accordance with the techniques discussed in FIG.

4) can include functionality to train a machine learning model to output regions in an environment and/or a score for a simulated scene(s). For example, the training component 448 can receive output data from the model component 446 or the model component 430 as training data.

In some instances, the training component 448 may be executed by the processor(s) 436 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 448 can include functionality to train a machine learning model to output classification values. For example, the training component 448 can receive data that represents labelled collision data (e.g. publicly available data, sensor data, and/or a combination thereof). At least a portion of the data can be used as an input to train the machine learning model. Thus, by providing data where the vehicle traverses an environment, the training component 448 can be trained to output occluded value(s) associated with objects and/or occluded region(s), as discussed herein.

In some examples, the training component 448 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 436 of the computing device(s) 434 may be any suitable processor capable of executing instructions to process data and perform operations as described herein. By way of example and not limitation, the processor(s) 416 and 436 may comprise one or more Central Processing Units (CPUs), Graphics Processing Units (GPUs), tensor processing units (TPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 438 are examples of non-transitory computer-readable media. The memory 418 and memory 438 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 434 and/or components of the computing device(s) 434 may be associated with the vehicle 402. That is, the vehicle 402 may perform one or more of the functions associated with the computing device(s) 434, and vice versa.

Figure 5:
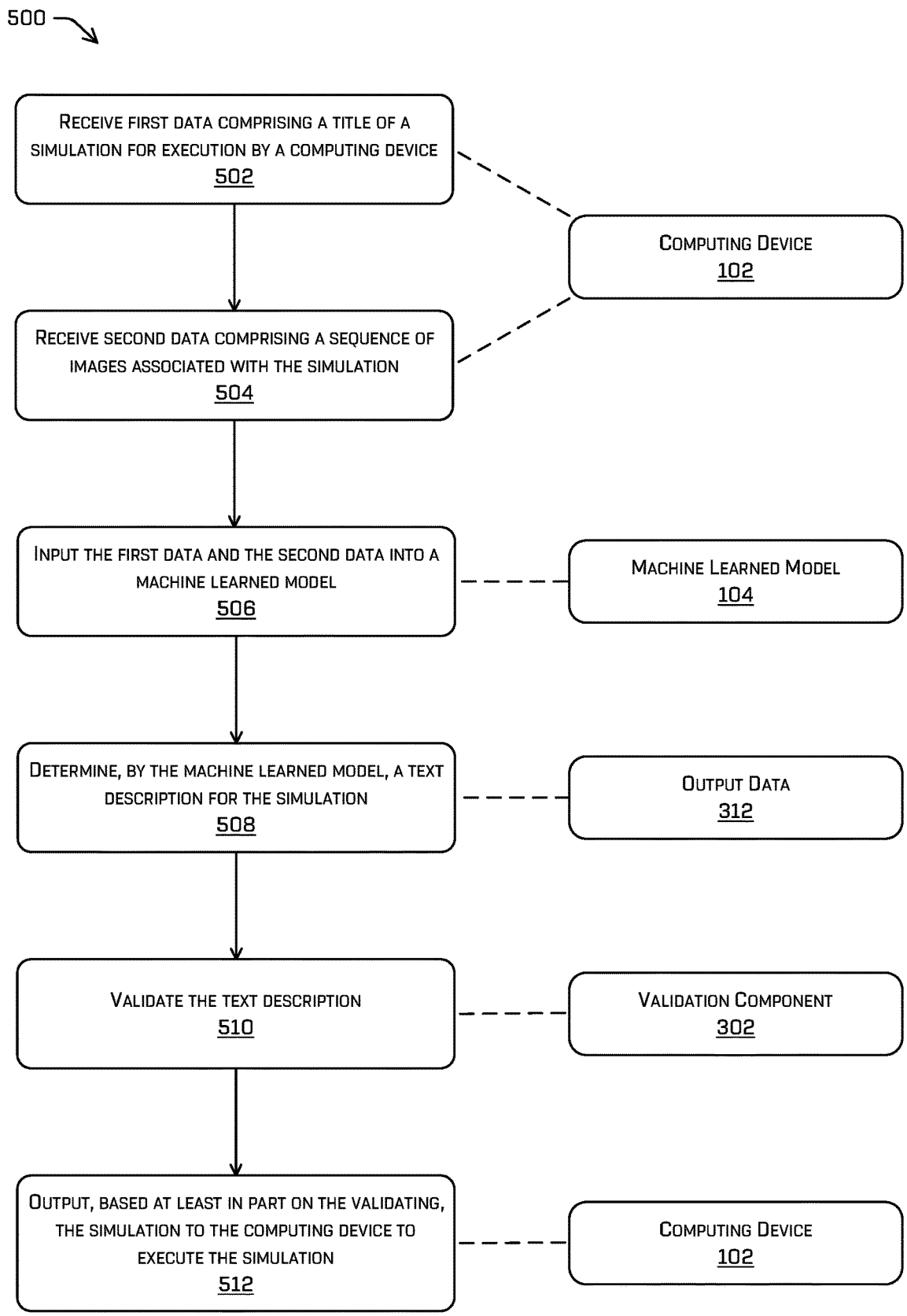
FIG. 5 is a flowchart depicting an example process for determining a text description of an example simulation.

FIG. 5 is a flowchart depicting an example process 500 for determining a text description of an example simulation. For example, some or all of the process 500 can be performed by one or more components in FIG. 1 or in FIG. 4, as described herein. For example, some or all of the process 500 can be performed by the computing device 102 discussed in relation to FIGS. 1 and 3, and elsewhere. Some or all of the process 500 may also or instead be performed by the model component 430 and/or the model component 446 of FIG. 4. In various examples, the process 500 can be associated with a simulated environment and/or a real-world environment.

At operation 502, the process can include receiving text data comprising a title of a scene. For instance, the computing device 102 can receive the title from a generative model that outputs a simulated scene to represent a real-world scene. In some examples, the text data can be received from a user interface indicating a title of a simulation job and/or a title of an existing scene (e.g., a scene in the database 110). The title can, for instance, represent a few words that generally describes the scene.

At operation 504, the process can include receiving image data of the scene, the image data including a vehicle and an object in the scene. For instance, the computing device 102 can receive the image data as part of the scene data from the generative model. In some examples, the image data can represent a top-down representation of a simulated environment that includes an autonomous vehicle having a vehicle computing device that is configured to avoid one or more objects in the simulated environment.

At operation 506, the process can include inputting the text data and the image data into a machine learned model. For instance, the computing device 102 can input the text data and the image data into the machine learned model 104 for processing.

At operation 508, the process can include determining, by the machine learned model, a text description for the scene. For example, the machine learned model 104 can generate the output data 312.

At operation 510, the process can include validating the text description. For instance, the computing device 102 can implement the validation component 302 to validate the output data 312 (e.g., determine whether the text description is sufficiently accurate to associate with the scene). The validation component 302 may, in some examples, receive a user input from a user interface indicating whether to accept or deny the text description. In various examples, the validation component 302 may receive a classification (e.g., yes or no) from a model to indicate whether the text description is valid for further processing.

At operation 512, the process can include outputting, based at least in part on the validating, the scene to a computing device associated with the vehicle to perform a simulation using the scene. For instance, based at least in part on the validation component 302 receiving an indication of a valid text description, scene data associated with the scene can be transmitted to a vehicle computing device (e.g., the vehicle computing device(s) 404) for executing the scene as part of a simulation. In some examples, the vehicle computing device can control the vehicle in an environment based at least in part on an outcome of the simulation.

The operation 512 can include, sending the output data 312 to one or more of: a vehicle computing device (e.g., the vehicle computing device 404), a perception component (e.g., the perception component 422), a planning component (e.g., the planning component 424), the system controller(s) 426, and the like. The output data 312 from the machine learned model 104 can also or instead be sent to a remote computing device configured to train a machine learned model or another component.

Though the process 500 is discussed in the context of vehicle in some examples the techniques discussed herein can include other robotic devices or systems.

FIGS. 2 and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process may omit operation 504 and/or 510 (e.g., may receive only text data as input, and the validation operation 510 may not be required to use the output data 312).

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving text data comprising an initial description of a scene; receiving image data of the scene, the image data including a vehicle and an object in the scene; inputting the text data and the image data into a machine learned model; determining, by the machine learned model, a text description for the scene that is more descriptive than the initial description; outputting, based at least in part on the text description, the scene to a computing device associated with the vehicle to perform a simulation using the scene; and controlling the vehicle in an environment based at least in part on an outcome of the simulation.

B: The system of paragraph A, the operations further comprising: accessing the scene from a database after a period of time; inputting the scene into the machine learned model; receiving an updated text description for the scene; and determining whether to replace the text description with the updated text description for the scene.

C: The system of paragraph A or B, the operations further comprising: validating the text description comprises receiving input from a model or a user interface validating accuracy of the text description, wherein the outputting is based at least in part on the validating.

D: The system of any of paragraphs A-C, the operations further comprising: indexing the scene for search based at least in part on the initial description of the scene and the text description for the scene.

E: The system of any of paragraphs A-D, wherein the scene is a first scene and the text description is a first text description, and the operations further comprising: associating the first scene with a second scene based at least in part on a similarity between the first text description and a second text description associated with the second scene.

F: A method comprising: receiving first data comprising an initial description of a simulation for execution by a computing device; receiving second data representing the simulation; inputting the first data and the second data into a machine learned model; determining, by the machine learned model, a robust description for the simulation that is more descriptive than the initial description; and outputting, based at least in part on the robust description, the simulation to the computing device to execute the simulation.

G: The method of paragraph F, further comprising: controlling a vehicle in an environment based at least in part on an outcome of the simulation.

H: The method of paragraph F or G, further comprising: determining a change to a parameter for performing the simulation; and generating, based at least in part on the change, an updated text description for the simulation.

I: The method of paragraph H, wherein the computing device is a vehicle computing device, and further comprising: determining an outcome of the simulation; training a component of the vehicle computing device based at least in part on the outcome of the simulation; determining an action by the vehicle navigating in a real-world environment; and determining a difference between the outcome and the action, wherein generating the updated text description for the simulation is based at least in part on the difference.

J: The method of any of paragraphs F-I, wherein: validating the robust description comprises receiving input from a user interface validating accuracy of the robust description relative to one or more images associated with the simulation.

K: The method of any of paragraphs F-J, wherein the initial description comprises a title, and further comprising: associating, as simulation data, the robust description, the title, and the second data; storing the simulation data in a storage device; and indexing the simulation for search based at least in part on the title of the simulation and the robust description for the simulation.

L: The method of any of paragraphs F-K, further comprising: determining a similarity between the simulation and another simulation based at least in part on comparing the robust description to another text description associated with the other simulation.

M: The method of any of paragraphs F-L, wherein: the first data is log data, and the robust description describes portions of the log data in human-readable text.

N: The method of any of paragraphs F-M, wherein: the first data is received responsive to an input from a user interface.

O: The method of any of paragraphs F-N, further comprising: analyzing text descriptions associated with multiple simulations; identifying characteristics of a new simulation; comparing, as a comparison, the characteristics to the robust description; and determining, based at least in part on the comparison, whether to generate a new description for the new simulation.

P: The method of any of paragraphs F-O, wherein: the second data is a top-down representation of a scene associated with the simulation, the machine learned model is a Transformer model, the initial description is fewer than ten words, and the robust description includes additional text not included in the first data to add more specificity relative to the first data.

Q: One or more non-transitory computer-readable media storing instructions executable by one or more processors, wherein the instructions, when executed, cause the one or more processors to perform operations comprising: receiving first data comprising an initial description of a simulation for execution by a computing device; receiving second data representing the simulation; inputting the first data and the second data into a machine learned model; determining, by the machine learned model, a robust description for the simulation that is more descriptive than the initial description; and outputting, based at least in part on the robust description, the simulation to the computing device to execute the simulation.

R: The one or more non-transitory computer-readable media of paragraph Q, the operations further comprising: generating an updated text description for the simulation at a later time; and determining whether to replace the robust description with the updated text description in a databased configured to store information about various simulations for execution.

S: The one or more non-transitory computer-readable media of paragraph Q or R, wherein: validating the robust description comprises receiving input from a user interface validating accuracy of the robust description relative to one or more images associated with the simulation.

T: The one or more non-transitory computer-readable media of paragraph Q-S, wherein the initial description comprises a title, and the operations further comprising: associating, as simulation data, the robust description, the title, and the second data; storing the simulation data in a storage device; and indexing the simulation for search based at least in part on the title of the simulation and the robust description for the simulation.

U: The one or more non-transitory computer-readable media of any of paragraphs Q-T, wherein the robust description is human-readable or machine-readable.

V: The one or more non-transitory computer-readable media of any of paragraphs Q-U, wherein: the robust description includes additional information than the initial description, and the additional information is determined based on the initial description and the second data.

While the example clauses described above are described with respect to one particular implementation, it should be understood that, in the context of this document, the content of the example clauses can also be implemented via a method, device, system, computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by the one or more processors, wherein the instructions, when executed, cause the system to perform operations comprising:

receiving text data comprising an initial description of a scene;
receiving image data of the scene, the image data including a vehicle and an object in the scene;
inputting the text data and the image data into a machine learned model;
determining, by the machine learned model, a text description for the scene that is more descriptive than the initial description;
outputting, based at least in part on the text description, the scene to a computing device associated with the vehicle to perform a simulation using the scene; and
controlling the vehicle in an environment based at least in part on an outcome of the simulation.

2. The system of claim 1, the operations further comprising:
accessing the scene from a database after a period of time;
inputting the scene into the machine learned model;
receiving an updated text description for the scene; and
determining whether to replace the text description with the updated text description for the scene.

3. The system of claim 1, the operations further comprising:
validating the text description comprises receiving input from a model or a user interface validating accuracy of the text description,
wherein the outputting is based at least in part on the validating.

4. The system of claim 1, the operations further comprising:
indexing the scene for search based at least in part on the initial description of the scene and the text description for the scene.

5. The system of claim 1, wherein the scene is a first scene and the text description is a first text description, and the operations further comprising:
associating the first scene with a second scene based at least in part on a similarity between the first text description and a second text description associated with the second scene.

6. A method comprising:
receiving first data comprising an initial description of a simulation for execution by a computing device;
receiving second data representing the simulation;
inputting the first data and the second data into a machine learned model;
determining, by the machine learned model, a robust description for the simulation that is more descriptive than the initial description;
outputting, based at least in part on the robust description, the simulation to the computing device to execute the simulation; and
controlling a vehicle in an environment based at least in part on an outcome of the simulation.

7. The method of claim 6, further comprising:
determining a change to a parameter for performing the simulation; and
generating, based at least in part on the change, an updated text description for the simulation.

8. The method of claim 7, wherein the computing device is a vehicle computing device, and further comprising:
training a component of the vehicle computing device based at least in part on the outcome of the simulation;
determining an action by the vehicle navigating in a real-world environment; and
determining a difference between the outcome and the action,
wherein generating the updated text description for the simulation is based at least in part on the difference.

9. The method of claim 6, wherein:
validating the robust description comprises receiving input from a user interface validating accuracy of the robust description relative to one or more images associated with the simulation.

10. The method of claim 6, wherein the initial description comprises a title, and further comprising:
associating, as simulation data, the robust description, the title, and the second data;
storing the simulation data in a storage device; and
indexing the simulation for search based at least in part on the title of the simulation and the robust description for the simulation.

11. The method of claim 6, further comprising:
determining a similarity between the simulation and another simulation based at least in part on comparing the robust description to another text description associated with the other simulation.

12. The method of claim 6, wherein:
the first data is log data, and
the robust description describes portions of the log data in human-readable text.

13. The method of claim 6, wherein:
the first data is received responsive to an input from a user interface.

14. The method of claim 6, further comprising:
analyzing text descriptions associated with multiple simulations;
identifying characteristics of a new simulation;
comparing, as a comparison, the characteristics to the robust description; and
determining, based at least in part on the comparison, whether to generate a new description for the new simulation.

15. The method of claim 6, wherein:
the second data is a top-down representation of a scene associated with the simulation,
the machine learned model is a Transformer model,
the initial description is fewer than ten words, and
the robust description includes additional text not included in the first data to add more specificity relative to the first data.

16. One or more non-transitory computer-readable media storing instructions executable by one or more processors, wherein the instructions, when executed, cause the one or more processors to perform operations comprising:
receiving first data comprising an initial description of a simulation for execution by a computing device;
receiving second data representing the simulation;
inputting, by the computing device, the first data and the second data into a machine learned model;
determining, by the machine learned model, a robust description for the simulation that is more descriptive than the initial description;
outputting, based at least in part on the robust description, the simulation to the computing device to execute the simulation; and
controlling a vehicle in an environment based at least in part on an outcome of the simulation.

17. The one or more non-transitory computer-readable media of claim 16, the operations further comprising:
generating an updated text description for the simulation at a later time; and determining whether to replace the robust description with the updated text description in a databased configured to store information about various simulations for execution.

18. The one or more non-transitory computer-readable media of claim 16, wherein:

validating the robust description comprises receiving input from a user interface validating accuracy of the robust description relative to one or more images associated with the simulation.

19. The one or more non-transitory computer-readable media of claim 16, wherein the initial description comprises a title, and the operations further comprising:

associating, as simulation data, the robust description, the title, and the second data;

storing the simulation data in a storage device; and indexing the simulation for search based at least in part on the title of the simulation and the robust description for the simulation.

20. The one or more non-transitory computer-readable media of claim 16, wherein the robust description is human-readable or machine-readable.

21. The one or more non-transitory computer-readable media of claim 16, wherein:

the robust description includes additional information than the initial description, and the additional information is determined based on the initial description and the second data.

22. The one or more non-transitory computer-readable media of claim 16, wherein the computing device inputs the first data and the second data into the machine learned model based at least in part on receiving the first data and the second data.

* * * * *